UNITED STATES PATENT OFFICE.

ZACHARIE ROUSSIN AND ALCIDE FRANÇOIS POIRRIER, OF PARIS, FRANCE.

IMPROVEMENT IN COLORS DERIVED FROM TOLUIDINE AND XYLIDINE.

Specification forming part of Letters Patent No. 211,671, dated January 28, 1879; application filed November 29, 1878.

*To all whom it may concern:*

Be it known that we, ZACHARIE ROUSSIN, chemist, and ALCIDE FRANÇOIS POIRRIER, manufacturer, both of Paris, in the Republic of France, have invented a new coloring-matter, obtained by the reaction of the diazoic derivative of toluidine and xylidine upon the amines, the amides, and phenols; and we hereby declare the following to be a full, clear, and exact description of the same.

The preparation of the diazoic derivative is effected in the following manner: The toluidines (either ortho or para) are all transformed, first, into sulfoconjugated acids at a temperature of + 180° centigrade by means of concentrated or fuming sulphuric acid.

The reaction will be completed when a few drops of the liquid dropped into alkaline-water will no longer produce a precipitate of toluidine. The sulfoconjugated acid thus produced is precipitated by the addition of cold water, and the crystalline mass is, after expulsion of the water, transformed into sodic salt. This sodic salt, in aqueous solution, is then mixed with an aqueous solution of nitrite of soda. These two salts are taken in equal equivalents. Into this mixture is then poured, while keeping it well stirred, a mixture of one part concentrated sulphuric acid and four parts water, until all the soda of the two salts is transformed into sodic sulphate. The diazoic derivative thus formed keeps in solution if the liquid be but little concentrated; otherwise it will be partially precipitated.

PREPARATION OF THE COLORING-MATTER.

1. *Reaction of the above-mentioned diazoic derivative upon the alpha-naphthol.*—This is effected in the manner as follows: At the ordinary temperature, and in a body of water, the two preceding substances are brought into contact with each other, and are briskly agitated for at least twenty-four hours. The coloring-matter is thus produced. The mass is thrown upon a canvas filter, and, when drained, it is washed with cold water, compressed, dried, and pulverized. It can also be transformed into a sodic combination, which is more soluble. This coloring-matter dyes wool and silk crimson-red or saffron-red.

2. *Reaction of the diazoic derivatives upon beta-naphthol.*—The diazoic derivative and the beta-naphthol are mixed in equal equivalents. The naphthol is previously dissolved in a necessary quantity of alkaline solution. The coloring-matter which is thus formed instantaneously is orange, and it may be purified either by crystallization or by precipitation with common salt. The crystals are drained and dried.

3. *Reaction of the diazoic derivatives upon the diphenylamine.*—One equivalent of diphenylamine, very finely divided, is stirred for from twenty-four to forty-eight hours in an aqueous solution containing one equivalent of the diazoic derivative of sulfoconjugated toluidines. The reaction is completed when a small portion of the mixture is integrally dissolved in ammoniacal water. The precipitate thus formed is gathered upon a canvas filter, washed with cold water, and transformed into the ammoniacal or sodic salt. This coloring-matter produces shades of a beautiful and bright yellow. An analogous yellow compound is obtained under similar conditions by substituting for the diphenylamine either aniline or the toluidines, or even the xylidines. By substituting phenic acid for the beta-naphthol, and operating as described under section 2, a yellow coloring-matter will be obtained. By substituting for the diphenylamine the diaminephenyline, and operating as described under section 3, a brownish-yellow coloring-matter will be obtained. The dinaphthylamine and the naphthyl-phenylamine substituted for the diphenylamine give, under the same conditions, red coloring-matters. Lastly, one equivalent of sulphate of methyl-aniline, reacting at ordinary temperatures upon a solution of one equivalent of the diazoic derivative of sulfoconjugated toluidine, produces a coloring-matter orange-red, which crystallizes easily as soon as the liquid previously boiled gets cold. The diazoic derivatives of the sulfoconjugated toluidines and xylidines produce coloring-matters which do not materially differ in their shades.

In the preceding combinations, which constitute so many coloring-matters, the sulphuric molecule is previously fixed upon the alkaloids. This condition is, however, not absolutely indispensable, for it will be readily understood that the same product may be obtained, first, by transferring the sulphuric group upon the phenols, the amines, or the amides; second, by causing the diazoic derivatives of toluidine and xylidine to react upon the phenols, the amines, or the amides, and by then sulfoconjugating the compounds thus produced.

To resume, therefore, we do not limit ourselves to the use, in the production of coloring-matters, of the azoic derivatives of the toluidines, but include also the same derivatives of the xylidines and their superior homologues which produce compounds of analogous nature and tint.

Having thus described our said invention, what we claim, and desire to secure by Letters Patent, is—

The herein-described new coloring-matter, obtained by the reaction of the diazoic derivative of the toluidines and xylidines upon the amines, the amides, and the phenols.

In testimony whereof we have signed our names to this specification before two subscribing witnesses.

Z. ROUSSIN.
A. POIRRIER.

Witnesses:
ROBT. M. HOOPER,
J. ARMENGAUD, Jeune.